United States Patent
Shieh et al.

(10) Patent No.: US 10,002,284 B2
(45) Date of Patent: Jun. 19, 2018

(54) ITERATIVE MATCHING METHOD AND SYSTEM FOR PARTIAL FINGERPRINT VERIFICATION

(71) Applicants: NCKU Research and Development Foundation, Tainan (TW); Himax Technologies Limited, Tainan (TW)

(72) Inventors: Ming-Der Shieh, Tainan (TW); Pao-Cheng Luo, Tainan (TW); Der-Wei Yang, Tainan (TW)

(73) Assignees: NCKU Research and Development Foundation, Tainan (TW); Himax Technologies Limited, Tainan (TW)

( * ) Notice: Subject to any disclaimer, the term of this patent is extended or adjusted under 35 U.S.C. 154(b) by 104 days.

(21) Appl. No.: 15/234,761

(22) Filed: Aug. 11, 2016

(65) Prior Publication Data

US 2018/0046843 A1  Feb. 15, 2018

(51) Int. Cl.
*G06K 9/00* (2006.01)

(52) U.S. Cl.
CPC ..... *G06K 9/00087* (2013.01); *G06K 9/00067* (2013.01)

(58) Field of Classification Search
USPC .............. 345/156; 348/46; 356/71; 382/103, 382/115, 124, 128, 152, 195; 707/722, 707/737; 710/1; 713/186
See application file for complete search history.

(56) References Cited

U.S. PATENT DOCUMENTS

| | | | | |
|---|---|---|---|---|
| 6,195,447 B1* | 2/2001 | Ross | ................. | G06K 9/00006 382/124 |
| 6,707,934 B1* | 3/2004 | Takeda | ............... | G06K 9/00087 356/71 |
| 2004/0107301 A1* | 6/2004 | Sato | .................... | G06F 3/03547 710/1 |
| 2004/0161135 A1* | 8/2004 | Sano | .................. | G06K 9/00087 382/124 |
| 2004/0169637 A1* | 9/2004 | Sato | .................... | G06F 3/03547 345/156 |
| 2005/0201611 A1* | 9/2005 | Lloyd, Jr. | ............... | F01D 5/141 382/152 |
| 2006/0104484 A1* | 5/2006 | Bolle | ................. | G06K 9/00073 382/115 |
| 2009/0022375 A1* | 1/2009 | Fidrich | ............... | G06K 9/6206 382/128 |
| 2010/0128927 A1* | 5/2010 | Ikenoue | ............. | G06K 9/00261 382/103 |

(Continued)

*Primary Examiner* — Xuemei Chen
(74) *Attorney, Agent, or Firm* — Donald E. Stout; Stout, Uxa & Buyan, LLP

(57) ABSTRACT

An iterative matching method for partial fingerprint verification includes providing database features and input features; initially comparing the input features with the database features using one of the database features as a first reference point, resulting in initial matched feature pairs between initial matched database features and corresponding initial matched input features; and progressively comparing the input features with the database features using a gravity center of the initial matched database features as a second reference point, resulting in progressive matched feature pairs between progressive matched database features and corresponding progressive matched input features.

16 Claims, 4 Drawing Sheets

(56) References Cited

U.S. PATENT DOCUMENTS

| | | | |
|---|---|---|---|
| 2011/0200256 A1* | 8/2011 | Saubat | G06K 9/2063 382/195 |
| 2011/0252035 A1* | 10/2011 | Tanaka | G06F 17/30017 707/737 |
| 2012/0229609 A1* | 9/2012 | Yamada | H04N 13/0264 348/46 |
| 2012/0243796 A1* | 9/2012 | Saito | G06T 5/006 382/218 |
| 2015/0088863 A1* | 3/2015 | Horiba | G06K 9/00073 707/722 |
| 2015/0358317 A1* | 12/2015 | Deutschmann | H04L 63/0861 713/186 |

* cited by examiner

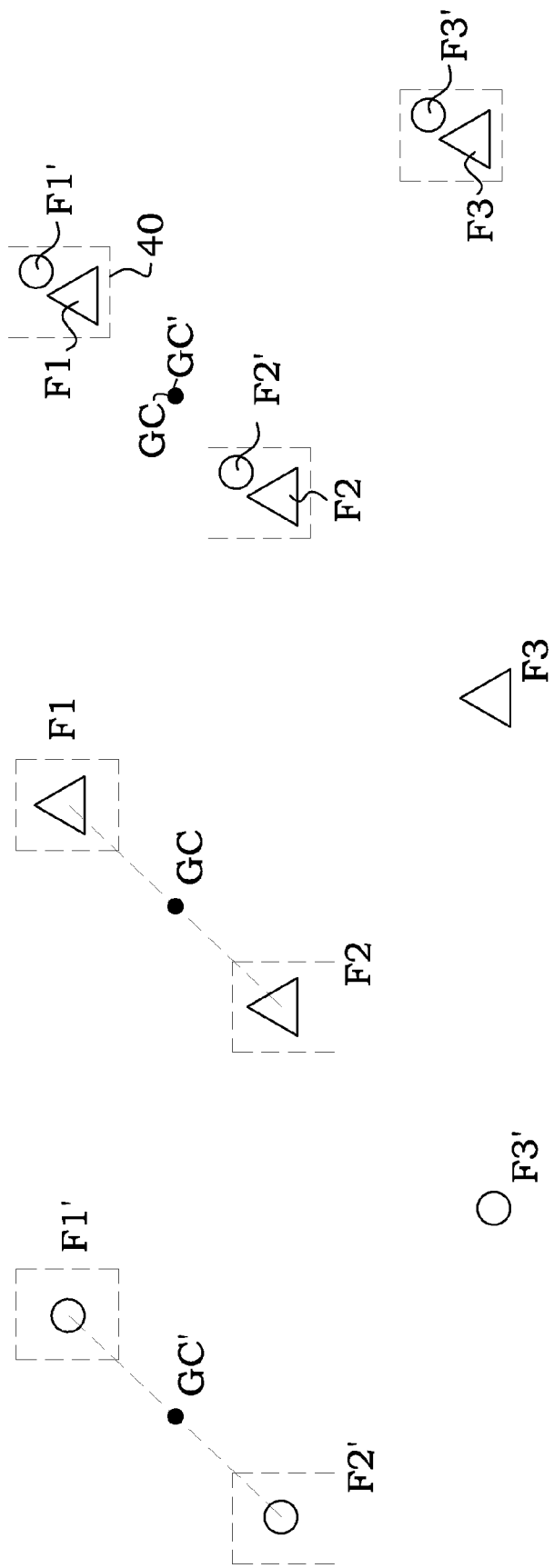

ITERATIVE MATCHING METHOD AND SYSTEM FOR PARTIAL FINGERPRINT VERIFICATION

BACKGROUND OF THE INVENTION

1. Field of the Invention

The present invention generally relates to fingerprint verification, and more particularly to an iterative matching method and system for partial fingerprint verification.

2. Description of Related Art

Fingerprints have been the most widely used biometrics applied as a form of identification and access control. Fingerprint verification has been gradually used in electronic devices, particularly handheld electronic devices (e.g., mobile phones or tablet personal computers) to replace password verification in a more convenient and safer manner.

A fingerprint is characterized by ridges and valleys, of which a pattern is uniquely made to each person. Major features of a fingerprint are minutiae that include, for example, ridge endings and ridge bifurcations. Fingerprint verification involves two stages: (1) enrolment and (2) matching. In the enrolment stage, enrollee fingerprints are acquired and stored in a database. In the matching stage, a claimant fingerprint is compared with the enrollee fingerprint.

Some fingerprint sensors, particularly of handheld electronic devices, have a size smaller than the magnitude of a typical fingerprint. Those fingerprint sensors, therefore, can at most detect partial information about the fingerprint. Accordingly, performance of fingerprint verification using the small-size fingerprint sensors would degrade greatly, compared to that using full-size fingerprint sensors.

Features (or minutiae), instead of a full fingerprint pattern, are commonly involved in fingerprint verification. However, due to deviation of corresponding features, relation of translation and rotation of the corresponding features usually causes feature mismatch, therefore decreasing performance, for example, measured in terms of genuine acceptance rate (GAR).

For the reason that conventional fingerprint verification could not be effectively performed based on a partial fingerprint input, a need has arisen to propose a novel method for partial fingerprint verification with enhanced effectiveness.

SUMMARY OF THE INVENTION

In view of the foregoing, it is an object of the embodiment of the present invention to provide an iterative matching method and system for partial fingerprint verification to achieve higher matching result and enhanced performance of fingerprint verification with little overhead in time.

According to one embodiment, database features and input features are provided. Initial feature matching is performed to initially compare the input features with the database features using one of the database features as a first reference point, resulting in initial matched feature pairs between initial matched database features and corresponding initial matched input features. Progressive feature matching is performed to progressively compare the input features with the database features using a gravity center of the initial matched database features as a second reference point, resulting in progressive matched feature pairs between progressive matched database features and corresponding progressive matched input features.

BRIEF DESCRIPTION OF THE DRAWINGS

FIG. 5A shows a gravity center of the initial matched database features of FIG. 4C;

FIG. 5B shows a gravity center of the initial matched input features of FIG. 4C; and FIG. 5C shows the database features and the input features after performing the progressive feature matching.

DETAILED DESCRIPTION OF THE INVENTION

Figure 1:
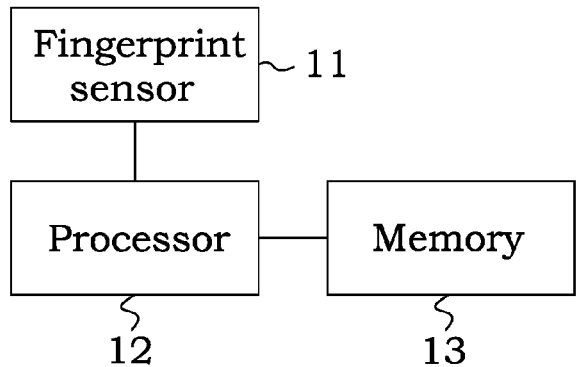
FIG. 1 shows a simplified block diagram illustrated of a fingerprint system adaptable to the embodiments of the present invention.

FIG. 1 shows a simplified block diagram illustrated of a fingerprint system 100 adaptable to the embodiments of the present invention. The fingerprint system 100 may include a fingerprint sensor 11 that is used to capture a fingerprint image, i.e., the digital image of a fingerprint pattern. In this specification, the term fingerprint image is usually abbreviated to fingerprint. Technologies adopted in the fingerprint sensor 11 may include, for example, capacitive, optical, radio frequency (RF), thermal and piezoresistive. The fingerprint image captured by the fingerprint sensor 11 is then digitally processed by a processor 12, such as a digital image processor, to extract features associated with the captured fingerprint image. The digital image processor is a type of digital signal processor used for image processing in electronic devices such as mobile phones or tablet personal computers. The extracted features are stored in a memory device (abbreviated as memory hereinafter) 13, and are used later for matching. The memory 13 may include one or more storage areas manufactured by the same or different storage technologies such as non-volatile memory and volatile memory. In the specification, the terms feature and minutiae are used interchangeably. Minutiae may refer to features of a fingerprint, using which comparisons can be made. Minutiae may include, for example, ridge ending, ridge bifurcation, short (or independent) ridge, island, ridge enclosure, spur, crossover (or bridge), delta and core.

Figure 2:
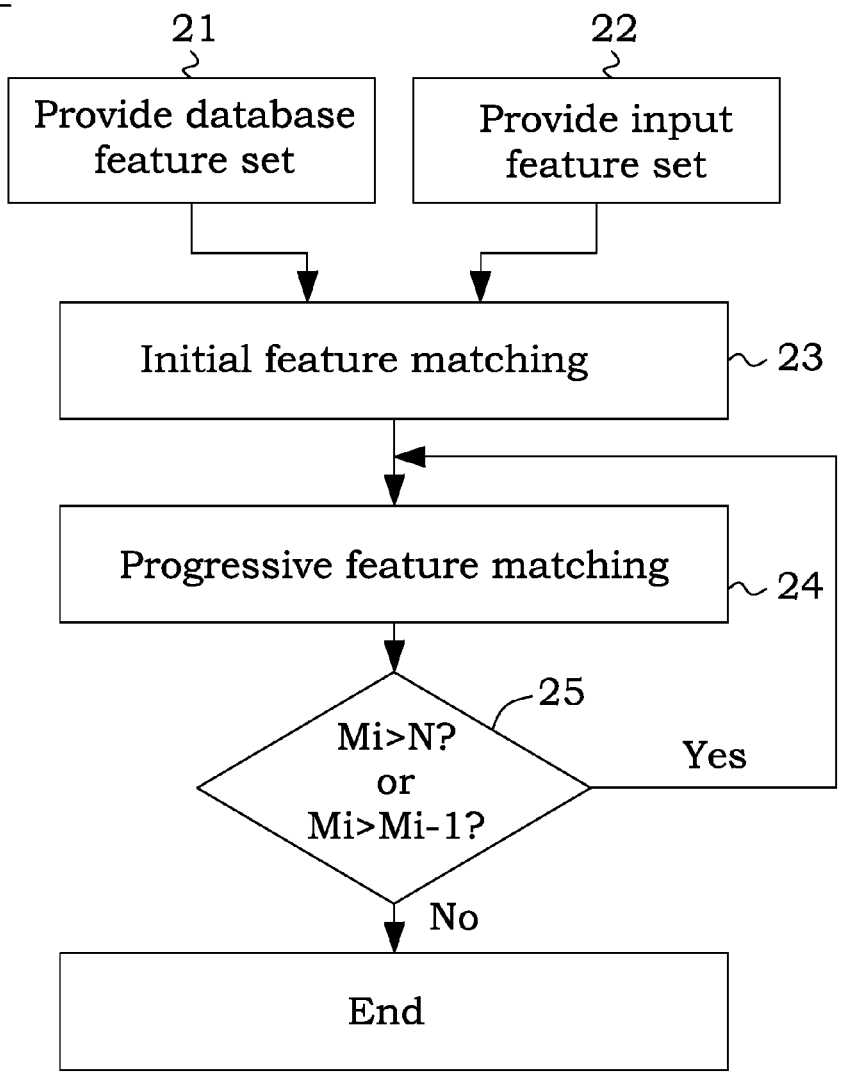
FIG. 2 shows a flow diagram illustrated of an iterative matching method for partial fingerprint verification according to one embodiment of the present invention.

FIG. 2 shows a flow diagram illustrated of an iterative matching method 200 for partial fingerprint verification according to one embodiment of the present invention. The steps of the iterative matching method 200 may be performed by an electronic circuit such as the processor 12 (FIG. 1) which performs operations on data from the fingerprint sensor 11 and/or memory 13, and generates outputs accordingly.

Figure 3:
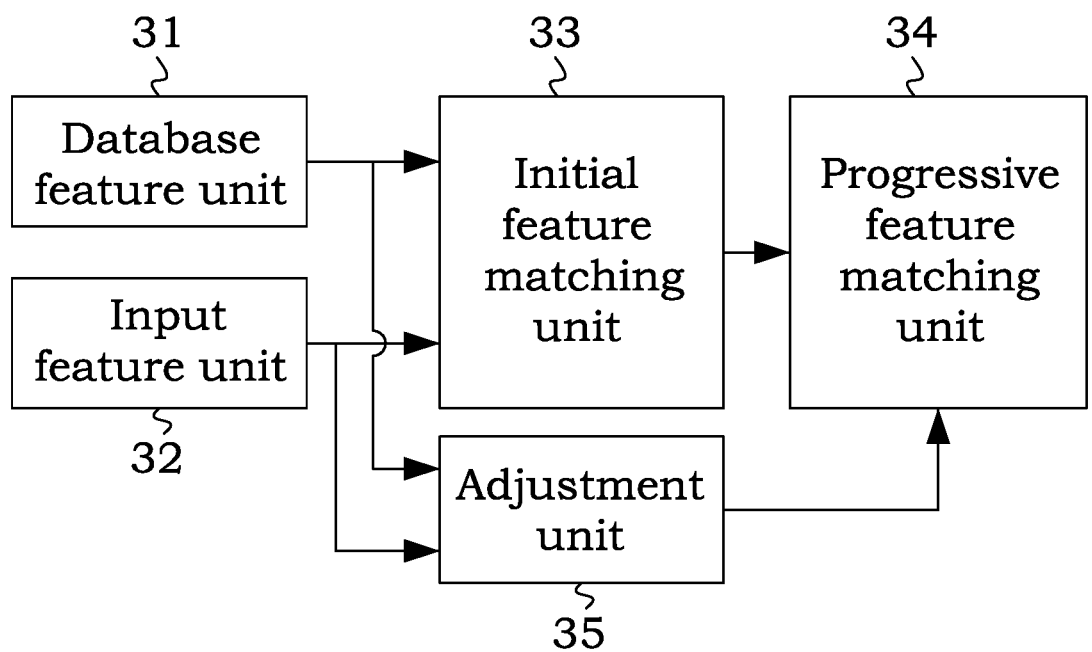
FIG. 3 shows a block diagram illustrated of an iterative matching system for partial fingerprint verification corresponding to the iterative matching method of FIG. 2 according to one embodiment of the present invention.

FIG. 3 shows a block diagram illustrated of an iterative matching system 300 for partial fingerprint verification corresponding to the iterative matching method 200 of FIG. 2 according to one embodiment of the present invention. The blocks of the iterative matching system 300 may be implemented by hardware, software or their combinations. In one embodiment, the blocks of the iterative matching system 300 may be implemented by the fingerprint sensor 11, the processor 12 and the memory 13, accompanied by software or instructions operable in the processor 12.

In step 21, a database feature set that includes database features (or enrollee features) is provided by a database feature unit 31 to create a biometric template which is stored beforehand and used for matching afterwards. Specifically, the database features are acquired (or captured) by the fingerprint sensor 11, are extracted by the processor 12, and are then stored in a database configured in the memory 13 for later use.

In step 22, an input feature set that includes input features (or claimant features) is provided by an input feature unit 32. Specifically, the input features are acquired (or captured) by the fingerprint sensor 11, are extracted by the processor 12, and are then temporarily stored in a storage area configured in the memory 13.

In the embodiment, the database features and the input features each may include data such as translation and rotation, expressed generally as $(x, y, \theta)$ where x represents translation (or coordinate) along X axis, y represents translation along Y axis, and $\theta$ represents rotation (e.g., ridge angle).

In step 23, the input features of the input feature set are initially compared with the database features of the database feature set by an initial feature matching unit 33, thereby performing initial feature matching. According to one aspect of the embodiment, the initial feature matching (step 23) is performed using one of the database features as a (first) reference point.

Figures 4A, 4B, 4C:
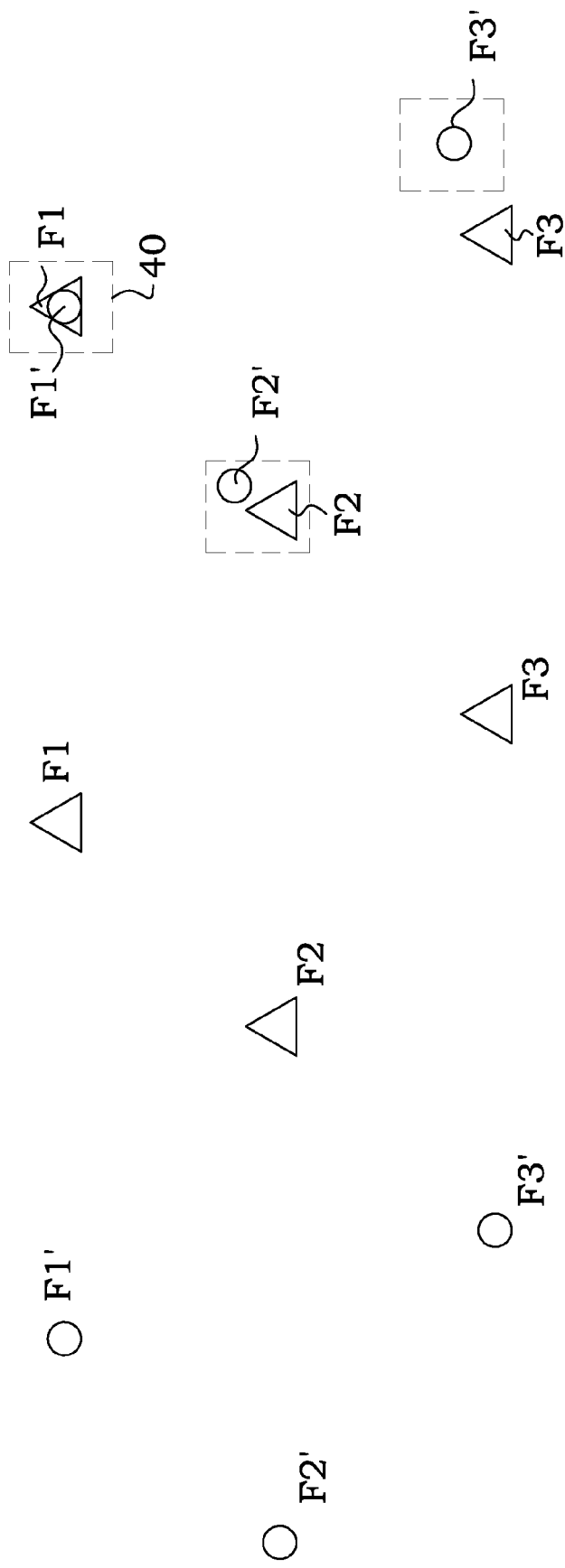
FIG. 4A shows exemplary database features.
FIG. 4B shows exemplary input features.
FIG. 4C shows the database features and the input features after performing the initial feature matching.

FIG. 4A shows exemplary database features denoted by circles, and FIG. 4B shows exemplary input features denoted by triangles. For better understanding the invention, the database feature set includes only three database features F1', F2' and F3' expressed as $(x1', y1', \theta1')$, $(x2', y2', \theta2')$ and $(x3', y3', \theta3')$ respectively; and the input feature set includes only three input features F1, F2 and F3 expressed as $(x1, y1, \theta1)$, $(x2, y2, \theta2)$ and $(x3, y3, \theta3)$ respectively.

Specifically speaking, in the initial feature matching (step 23), database feature F1' is used as the reference point, and the input features F1, F2 and F3 are translated according to the translations $(x1', y1')$ of the reference point F1' and the translations $(x1, y1)$ of a corresponding input feature F1, thereby overlapping F1 and F1'. Subsequently, the input features F1, F2 and F3 are rotated at the reference point with an angle determined by the rotation $(\theta1')$ of the reference point F1' and the rotation $(\theta1)$ of the corresponding input feature F1. The initial feature matching (step 23) may be performed using conventional techniques, details of which are omitted herein for brevity.

FIG. 4C shows the database features and the input features after performing the initial feature matching (step 23). As exemplified in FIG. 4C, there are two initial matched feature pairs (F1', F1) and (F2', F2) between initial matched database features (F1', F2') and corresponding initial matched input features (F1, F2) as they are situated in associated matching bounding boxes 40. In the embodiment, the matching bounding box 40 defines a range centering on an associated database feature. Also exemplified in FIG. 4C, there is an initial mismatched feature pair (F3', F3) as the input feature F3 is situated outside the associated matching bonding box 40. Therefore, after performing the initial feature matching (step 23), there are two initial matched database features F1' and F2', and two initial matched input features F1 and F2. Unfortunately, there is one initial mismatched database feature F3', and one initial mismatched input feature F3.

The initial feature matching as exemplified in FIGS. 4A-4C demonstrates only one of many possible matching combinations. For the example shown in FIGS. 4A-4C having three database features and three input features, there may be nine (i.e., 3×3) possible matching combinations. In general, there are n×m possible matching combinations for initial feature matching having n database features and m input features.

In step 24, the input features of the input feature set are progressively compared with the database features of the database feature set by a progressive feature matching unit 34, thereby performing progressive feature matching. According to another aspect of the embodiment, the progressive feature matching (step 24) is performed using a gravity center (GC) of initial matched database features as a (second) reference point. For example, the gravity center of the initial matched database features F1' and F2' is used as the reference point in the progressive feature matching (step 24). It is noted that the progressive feature matching (step 24) may be adapted to all matching combinations with at least two initial matched database features in the initial feature matching (step 23). In another embodiment, the progressive feature matching (step 24) may be adapted to a portion of the matching combinations. For example, the progressive feature matching (step 24) may be adapted to all matching combinations with at least p (p is an integer greater than 2) initial matched database features in the initial feature matching (step 23).

FIG. 5A shows a gravity center GC' of the initial matched database features of FIG. 4C, and FIG. 5B shows a gravity center GC of the initial matched input features of FIG. 4C. Specifically speaking, in the progressive feature matching (step 24), the gravity center GC' of the initial matched database features (e.g., F1' and F2') is used as the reference point, and the gravity center GC of the initial matched input features (e.g., F1 and F2) is translated according to translation differences between the initial matched database features and the initial matched input features, thereby overlapping GC and GC'. In the embodiment, $\Delta x1(=x1-x1')$ denotes translation difference of the initial matched feature pair (F1', F1) along X axis, and $\Delta y1(=y1-y1')$ denotes translation difference of the initial matched feature pair (F1', F1) along Y axis. Similarly, $\Delta x2(=x2-x2')$ denotes translation difference of the initial matched feature pair (F2', F2) along X axis, and $\Delta y2(=y2-y2')$ denotes translation difference of the initial matched feature pair (F2', F2) along Y axis.

Subsequently, the input features F1, F2 and F3 are rotated at the reference point with an angle determined by rotation differences between the initial matched database features and the initial matched input features. In the embodiment, $\Delta\theta1(=\theta1-\theta1')$ denotes rotation difference of the initial matched feature pair (F1, F1'), and $\Delta\theta2(=\theta2-\theta2')$ denotes rotation difference of the initial matched feature pair (F2, F2').

The translation differences (e.g., $\Delta x1$, $\Delta x2$, $\Delta y1$ and $\Delta y2$) and the rotation differences (e.g., $\Delta\theta1$ and $\Delta\theta2$) may be obtained by an adjustment unit 35 (FIG. 3). In addition to the translation differences and the rotation differences, the adjustment unit 35 may further generate an average translation difference that is the average of the translation differences (e.g., $(\Delta x1+\Delta x2)/2$ and $(\Delta y1+\Delta y2)/2$), and may generate an average rotation difference that is the average of the rotation differences (e.g., $(\Delta\theta1+\Delta\theta2)/2$). Accordingly, the gravity center GC of the initial matched input features (e.g., F1 and F2) is translated to overlap the gravity center GC' of the initial matched database features (e.g., F1' and F2') according to the average translation differences (i.e., $(\Delta x1+\Delta x2)/2$ and $(\Delta y1+\Delta y2)/2$), followed by rotating at the reference point with an angle equal to the average rotation difference (i.e., $(\Delta\theta1+\Delta\theta2)/2$).

FIG. 5C shows the database features and the input features after performing the progressive feature matching (step 24). As exemplified in FIG. 5C, in addition to progressive matched feature pairs (F1', F1) and (F2', F2), feature pair (F3', F3) also becomes a progressive matched feature pair as the input feature F3 is now situated inside the associated matching bonding box 40 due to progressive feature matching (step 24), thereby raising matching result and enhancing performance of fingerprint verification. Therefore, after performing the progressive feature matching (step 24), there are three progressive matched database features F1', F2' and F3', and three progressive matched input features F1, F2 and F3.

As shown in FIG. 2, the progressive feature matching (step 24) is iteratively performed unless the number Mi of the progressive matched feature pairs is not greater than the number N of the initial matched feature pairs or the number Mi−1 of the previously progressive matched feature pairs. Alternatively speaking, the progressive feature matching (step 24) is iteratively performed to raise matching result and enhance performance of fingerprint verification, until the number Mi of the progressive matched feature pairs no longer increases.

Although specific embodiments have been illustrated and described, it will be appreciated by those skilled in the art that various modifications may be made without departing from the scope of the present invention, which is intended to be limited solely by the appended claims.

What is claimed is:

1. An iterative matching method for partial fingerprint verification, comprising:
    providing a plurality of database features;
    providing a plurality of input features;
    performing initial feature matching to initially compare the input features with the database features using one of the database features as a first reference point, resulting in initial matched feature pairs between initial matched database features and corresponding initial matched input features; and
    performing progressive feature matching to progressively compare the input features with the database features using a gravity center of the initial matched database features as a second reference point, resulting in progressive matched feature pairs between progressive matched database features and corresponding progressive matched input features;
    wherein the step of performing the progressive feature matching is iteratively performed unless a number of the progressive matched feature pairs is not greater than a number of the initial matched feature pairs or a number of the progressive matched feature pairs obtained in a previously performed progressive feature matching.

2. The method of claim 1, wherein each of the database features and the input features includes translation and rotation.

3. The method of claim 2, in the initial feature matching, wherein the input features are translated according to the translation of the first reference point and the translation of a corresponding input feature.

4. The method of claim 3, in the initial feature matching, wherein the input features are rotated at the first reference point with an angle determined by the rotation of the first reference point and the rotation of the corresponding input feature.

5. The method of claim 1, in the progressive feature matching, wherein a gravity center of the initial matched input features is translated according to translation differences between the initial matched database features and the initial matched input features.

6. The method of claim 5, wherein the gravity center of the initial matched input features is translated according to an average translation difference that is an average of the translation differences.

7. The method of claim 5, in the progressive feature matching, wherein the input features are rotated at the second reference point with an angle determined by rotation differences between the initial matched database features and the initial matched input features.

8. The method of claim 7, wherein the input features are rotated at the second reference point with the angle determined by an average rotation difference that is an average of the rotation differences.

9. An iterative matching system for partial fingerprint verification, comprising:
    a database feature unit that provides a plurality of database features;
    an input feature unit that provides a plurality of input features;
    an initial feature matching unit that performs initial feature matching to initially compare the input features with the database features using one of the database features as a first reference point, resulting in initial matched feature pairs between initial matched database features and corresponding initial matched input features; and
    a progressive feature matching unit that performs progressive feature matching to progressively compare the input features with the database features using a gravity center of the initial matched database features as a second reference point, resulting in progressive matched feature pairs between progressive matched database features and corresponding progressive matched input features;
    wherein the progressive feature matching unit iteratively performs the progressive feature matching unless a number of the progressive matched feature pairs is not greater than a number of the initial matched feature pairs or a number of the progressive matched feature pairs obtained in a previously performed progressive feature matching.

10. The system of claim 9, wherein each of the database features and the input features includes translation and rotation.

11. The system of claim 10, in the initial feature matching, wherein the input features are translated according to the translation of the first reference point and the translation of a corresponding input feature.

12. The system of claim 11, in the initial feature matching, wherein the input features are rotated at the first reference point with an angle determined by the rotation of the first reference point and the rotation of the corresponding input feature.

13. The system of claim 9, further comprising an adjustment unit that generates translation differences between the initial matched database features and the initial matched input features, according to which, in the progressive feature matching, a gravity center of the initial matched input features is translated.

14. The system of claim 13, wherein the adjustment unit generates an average translation difference that is an average of the translation differences, according to which the gravity center of the initial matched input features is translated.

15. The system of claim 13, wherein the adjustment unit generates rotation differences between the initial matched database features and the initial matched input features, by which an angle is determined with which, in the progressive feature matching, the input features are rotated at the second reference point.

16. The system of claim 15, wherein the adjustment unit generates an average rotation difference that is an average of the rotation differences, by which the angle is determined with which the input features are rotated at the second reference point.

* * * * *